United States Patent
Galbreath et al.

(12)

(10) Patent No.: US 6,695,553 B1
(45) Date of Patent: Feb. 24, 2004

(54) DEVICE FOR SECURING A CONTAINER TO A HOIST

(76) Inventors: Donald E. Galbreath, 500 S. Monticello, Winamac, IN (US) 46996; Francis Widner, 614 N. Riverside, Winamac, IN (US) 46996; Randall D. Sommers, 8131 S. 1000 W., Kewanna, IN (US) 46939

( * ) Notice: Subject to any disclaimer, the term of this patent is extended or adjusted under 35 U.S.C. 154(b) by 0 days.

(21) Appl. No.: 09/995,487

(22) Filed: Nov. 28, 2001

(51) Int. Cl.⁷ .................................................. B60P 7/08
(52) U.S. Cl. ......................................... 410/80; 410/77
(58) Field of Search ............................. 410/80, 77, 78, 410/69, 72, 73, 76; 414/498; 248/500, 503; 292/106, 109

(56) References Cited

U.S. PATENT DOCUMENTS

| | | | |
|---|---|---|---|
| 1,303,854 A | * | 5/1919 | Clark |
| 1,470,266 A | | 10/1923 | Kirchner |
| 1,862,632 A | * | 6/1932 | Perin |
| 1,988,651 A | * | 1/1935 | Fildes |
| 2,351,314 A | * | 6/1944 | Ario |
| 3,158,106 A | * | 11/1964 | Clejan |
| 3,210,038 A | | 10/1965 | Bader et al. |
| 3,282,550 A | * | 11/1966 | Warren |
| 4,121,789 A | | 10/1978 | Lent et al. |
| 4,236,853 A | * | 12/1980 | Niggemeier et al. ......... 410/77 |
| 4,349,302 A | | 9/1982 | Ferguson, Jr. ................ 410/69 |
| 4,375,932 A | * | 3/1983 | Alberti ........................ 410/69 |
| 4,557,648 A | | 12/1985 | Koch et al. ................... 410/78 |
| 5,106,247 A | | 4/1992 | Hove et al. ................... 410/73 |
| 5,112,173 A | | 5/1992 | Eilenstein et al. ............ 410/79 |
| 5,362,184 A | * | 11/1994 | Hull et al. .................... 410/90 |
| 5,618,138 A | | 4/1997 | Lockhart ...................... 410/69 |
| 5,829,946 A | * | 11/1998 | McNeilus et al. |
| 5,957,640 A | | 9/1999 | Schmieke et al. ............ 410/80 |
| 6,053,692 A | | 4/2000 | Mason et al. |
| 6,315,508 B1 | * | 11/2001 | Nadon ......................... 410/80 |
| 6,425,717 B1 | * | 7/2002 | Saggio et al. ................. 410/79 |

* cited by examiner

*Primary Examiner*—Stephen T. Gordon
(74) *Attorney, Agent, or Firm*—Woodard, Emhardt, Moriarty, McNett & Henry LLP (57) ABSTRACT

A device for securing a container to a hoist includes a frame rigidly connectable to the hoist; first and second hooks mounted in mutually close proximity and to the frame to rotate about an axis between a retracted, unlocked position away from the long sill of the container and an activated, locking position disposed at least partially over the long sill; an actuator mounted to the frame to move between an activating position and a retracting position, the actuator engageable with the hooks to rotate the hooks from the activated, locking position to the retracted, unlocked position when the actuator moves from the activating position and the retracting position; springs operationally connected with the hooks for urging the hooks toward the activated, locking position; and, a power device connected with the actuator to move the actuator between the activating and retracting positions.

28 Claims, 7 Drawing Sheets

DEVICE FOR SECURING A CONTAINER TO A HOIST

FIELD OF THE INVENTION

The present invention relates to the field of material-hauling containers and vehicles for transporting such containers, and specifically to devices for securing such containers to the vehicles.

BACKGROUND OF THE INVENTION

Large containers are available for collecting, transporting and/or dumping waste, bulk and liquid materials. A typical container will include at least a pair of long sills running the length thereof and a plurality of laterally extending cross sills spaced along the length of and atop the long sills. Such containers are transported on large container hoists that include a vehicle with a hoist frame hingedly connected to the rear of the vehicle frame. The hoist frame includes a long pair of hoist frame rails and can be pivoted between a container loading, unloading and dumping position and a horizontal transport position. When a container is pulled atop the hoist frame, the long sills of the container straddle the hoist frame rails, and the front of the container is secured to the front end of the hoist by the lifting device or other suitable restraint mechanism, in accord with the applicable governing regulations. Such regulations also provide that the rear of the container must likewise be secured. One acceptable manner of tiedown is by hooks or an equivalent mechanism, securing both sides of the container to the vehicle chassis or hoist frame. Such mechanism must be within two meters of the rear of the container.

A variety of hold-down mechanisms have been devised to secure the rear end of a container to the hoist frame. One type of hold-down device includes a fixed hook mounted on each side of the container hoist and mating posts extending outwardly from opposing sides of the container. As the container is pulled up onto the hoist, the posts register under the fixed hooks to secure the container onto the hoist. There are a number of problems associated with this type of arrangement. For example, some containers may lack the mating post, in which case there will be nothing to hold the rear end of the container down which, in addition to being a violation of the federal regulations, would pose a significant safety concern. Another problem is that the fixed hook and post design does not permit longitudinal adjustment of the container on the hoist, which is often desired to optimized the weight distribution of the load over the vehicle axles.

Another type of hold-down device includes a hook pivotably mounted to the hoist frame and operable to pivot up and over the container long sill. Such devices frequently fail to lockingly engage with the container long sill, however, because one of the container cross sills obstructs the pivoting hook's path. This occurs because the vehicle hoists and containers vary in size and configuration from one manufacturer to another and because the containers are not always located in the exact same position upon a particular hoist. For example, the spacing between adjacent cross sills of typical containers can vary between 12 and 20 inches. In special cases where extraordinary strength is needed, a container could be made with cross sills spaced considerably closer together. As a result, the chances are fairly good that a cross sill of a container will align with the hold-down hook of a hoist, which in turn will prevent the hook from properly engaging with the container long sill.

What is desired is an improved device for holding a container down in a secure position atop a vehicle-mounted hoist frame.

SUMMARY OF THE INVENTION

Generally speaking, there is provided a device for securing a container to a vehicle-mounted hoist frame, the device including a mutually proximal pair of hooks that can be actuated to pivot up and over the top of the long sill of a container.

A device for securing a container to a hoist includes a frame rigidly connectable to the hoist; first and second hooks mounted in mutually close proximity and to the frame to rotate about an axis between a retracted, unlocked position away from the long sill of the container and an activated, locking position disposed at least partially over the long sill; an actuator mounted to the frame to move between an activating position and a retracting position, the actuator engageable with the hooks to rotate the hooks from the activated, locking position to the retracted, unlocked position when the actuator moves from the activating position and the retracting position; springs operationally connected with the hooks for urging the hooks toward the activated, locking position; and, a power device connected with the actuator to move the actuator between the activating and retracting positions.

It is an object of the present invention to provide an improved device for holding a container securely onto a vehicle-mounted hoist frame.

Other objects and advantages of the present invention will become apparent from the following description of the preferred embodiment.

BRIEF DESCRIPTION OF THE INVENTION

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and that any alterations or modifications in the illustrated device, and any further applications of the principles of the invention as illustrated therein are contemplated as would normally occur to one skilled in the art to which the invention relates.

Figure 1:
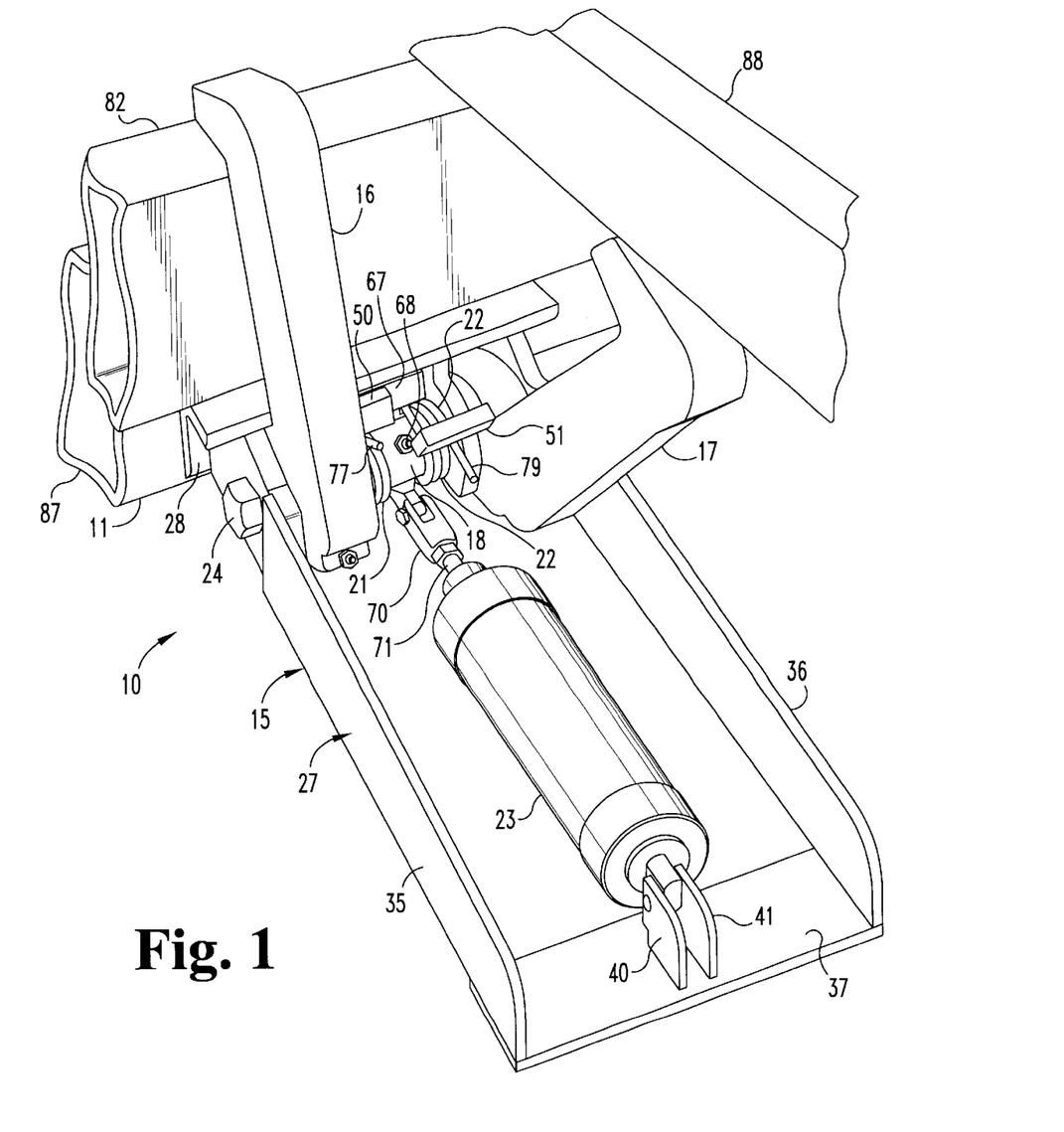
FIG. 1 is a perspective view of a hold-down device 10 in accordance with the preferred embodiment of the present invention.
Figure 2:
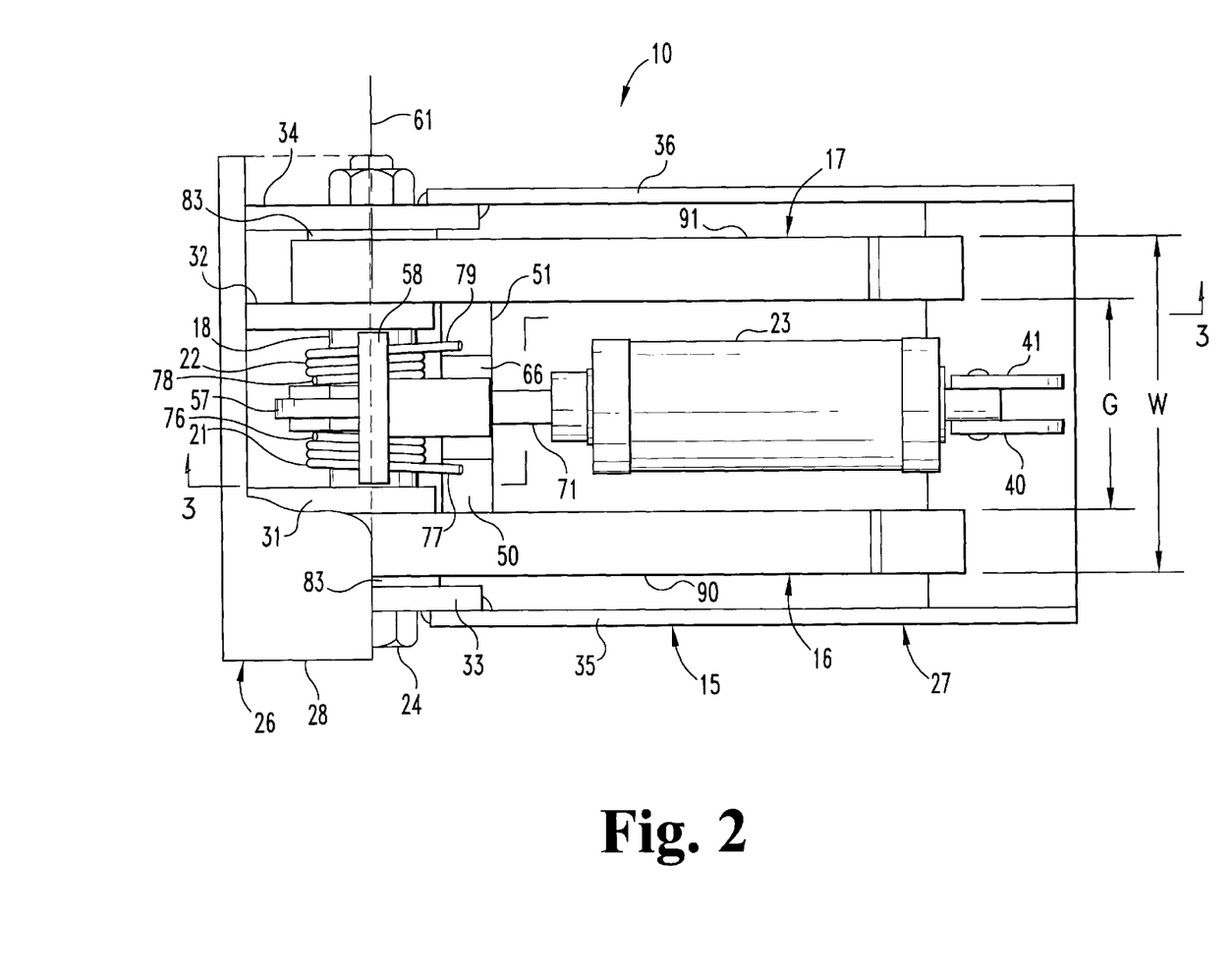
FIG. 2 is a plan view of the hold-down device 10 of FIG. 1 and showing hooks 16 and 17 in the retracted, unlocked position.
Figure 3:
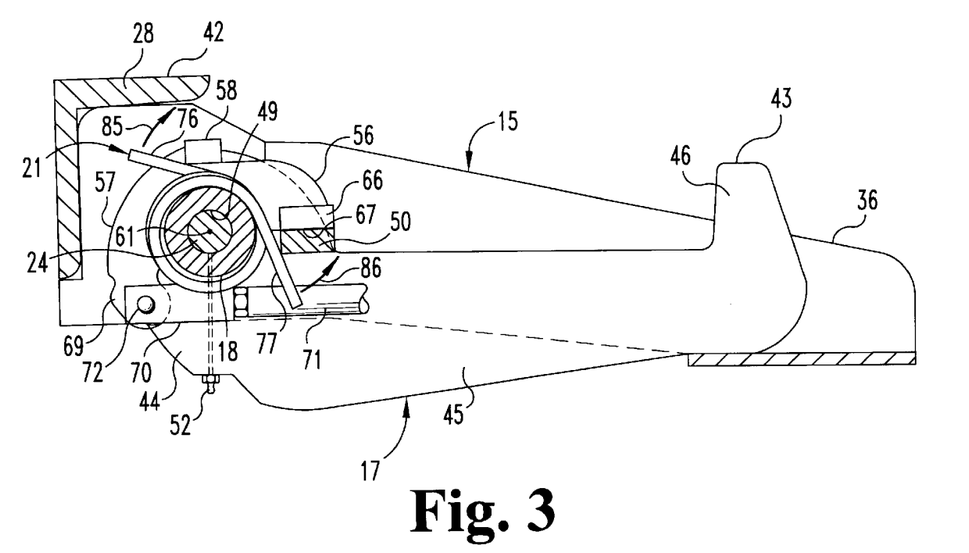
FIG. 3 is a side elevational view of the hold-down device 10 of FIG. 2, taken along the lines 3—3 and viewed in the direction of the arrows.

Referring to FIGS. 1–3, there is shown a hold-down device 10 for securing a container onto the hoist frame 11 of a vehicle (not shown). The vehicle is any appropriate vehicle designed to pick up and carry a container such as a container for hauling waste. Such vehicle typically is provided with a hoist frame hingedly connected to the rear of the vehicle so that the hoist frame 11 may be pivoted between a horizontal transport position and an inclined loading, unloading and dumping position. Such vehicles are well known in the material hauling industry.

Device 10 generally includes a support frame 15, a pair of hooks 16 and 17, a central hook actuator 18, a pair of coil springs 21 and 22, an air cylinder 23 and a pivot axle 24. Frame 15 includes a main mounting bracket 26 and a housing body 27. Main mounting bracket 26 includes an angle iron brace 28, a pair of inner mounting brackets 31 and 32 and a pair of outer mounting brackets 33 and 34. Mounting brackets 31–34 each define mutually co-axial holes sized to receive axle 24 therethrough. Housing body 27 includes a pair of opposing side walls 35 and 36 and front cross member 37 rigidly extending between walls 35 and 36. Side walls 35 and 36 are rigidly connected at their inboard ends to outer mounting brackets 33 and 34 by any appropriate means such as welding, as shown. Front cross member 37 further includes a pair of upstanding cylinder mounting brackets 40 and 41. Frame 15 has an uppermost surface 42 that is located on the top of brace 28. In the 5 retracted, unlocked position (FIG. 3), all remaining elements of device 10 lie below surface 42. Consequently, when device 10 is mounted to hoist frame 11 and the hooks 16 and 17 are retracted, device 10 is located sufficiently below and will not obstruct any downwardly protruding elements (such as wheels) of a container being loaded on hoist frame 11. In one embodiment, the uppermost edge 43 of hook 17 in the retracted position (FIG. 3) is at least two inches below surface 42. While container configurations will vary from one container to another, the design of hold-down device 10 enables both a flat and low profile while also allowing the hooks 16 and 17 to rotate up to a secure locking position on a widely sized range of containers.

Hooks 16 and 17 are mirror images of each other, and description will primarily be directed to just one of hooks 16 and 17, it being understood to apply to the other of the hooks in mirror fashion. Hook 17 includes a central mounting portion 44, a leg 45 extending generally radially outwardly from mounting portion 44, and a hook member 46 extending generally orthogonally from arm 45, as shown in FIG. 3. Central mounting portion 44 includes a central hole 49 sized to receive axle 24 therethrough. Hook 17 further defines a control arm 51 that extends laterally from a region on mounting portion 44 approximately at the juncture of mounting portion 44 and leg 45 and toward the other hook 16. Control arms 51 and 50 (of hook 16) extend toward each other an equal distance, but do not touch. Hooks 16 and 17 are each provided with a grease fill port 52 that is in communication with its central hole 49.

Referring to FIGS. 1–4, central actuator 18 includes a central, cylindrically shaped hub 55, a control fin 56, a piston connection fin 57, and a spring bar 58. Hub 55 defines a central bore 60 with an axis 61, the bore 60 extending through the width of hub 55 and being sized to receive axle 24 therethrough. For purposes of description, hub 55 also includes opposing left and right annular faces 64 and 65 that are in mutually parallel planes and orthogonal to axis 61. Also extending substantially perpendicular to axis 61 are forwardly extending control fin 56 and rearwardly extending piston connection fin 57. Control fin 56 includes a hook bar 66 with a downwardly facing engagement surface 67 that is configured and positioned to engage with the control arms 50 and 51 of hooks 16 and 17 during operation of hold-down device 10, as discussed herein. In the present embodiment, surface 67 lies in the same plane with axis 61. A grease fill port 68 (FIGS. 1 and 8) is provided to hub 55, the port 68 being in communication with central bore 60.

Piston connection fin 57 extends rearwardly of axis 61 (to the left in FIG. 2) and downwardly of planar surface 67 (as viewed in FIG. 2). At its outboard end 69, fin 57 rotatably connects with the outboard end 70 of piston rod 71 of air cylinder 23 by a pin 72 that extends through a hole 73 in fin 57. Hole 73 is disposed far enough below planar surface 67 to permit piston rod 71 to connect with hole 73 without contacting hub 55 in the retracted, unlocked position shown in FIG. 3. Piston connection fin 57 also defines a spring tool recess 74 in its outboard end 69, proximal to hole 73.

Like hooks 16 and 17, coil springs 21 and 22 are mirror images of each other, and description of one is intended to apply in mirror fashion to the other. Springs 21 and 22 are coil springs with their terminal arms 76–77 and 78–79 extending substantially tangentially therefrom. Springs 21 and 22 are operationally engaged with hooks 16 and 17 to urge hooks 16 and 17 toward the activated, locking position shown in FIG. 5. The spring constant K of spring 22 is selected to cause corresponding hook 17 to firmly engage and stay in the locking position over a long sill 82 of a container, but also to permit the corresponding hook to be manually pulled away from the locking position. In one embodiment, spring 22 is a coil spring with a Spring Index C of 10.5942, a Rate of 2.2470# —in/deg.and a Nat. Freq. of 120.2847 Hz.

Hooks 16 and 17, springs 21 and 22 and central hook actuator 18 are mounted for rotation to frame 15 by axle 24. In one embodiment, axle 24 is a bolt and a nut. These elements are assembled as shown in FIGS. 1–3 whereby springs 21 and 22 encircle hub 55 on opposite sides of control fin 56 and are preloaded, as described herein. Central actuator 18 and springs 21 and 22 are then positioned between inner mounting brackets 31 and 32, and hooks 16 and 17 are positioned between their respective mounting bracket pairs 31, 33 and 32, 34, respectively, as shown in FIG. 3. Axle 24 is then received through the now coaxial holes in all these members to permit hooks 16 and 17, central hook actuator 18 and springs 21 and 22 to rotate about axle 24. Washers, such as at 83 are provided between certain of these members, as desired. As shown in FIG. 3, spring 21 is disposed upon hub 55 such that terminal arm 76 is lodged counter clockwise of spring bar 58, and the opposing terminal arm 77 is disposed clockwise of control arm 50. Furthermore, terminal arms 76 and 77 are stressed in the positions shown in FIG. 2 such that terminal arms 76 and 77 are biased to unwind toward each other in the direction of arrows 85 and 86.

Figure 4:
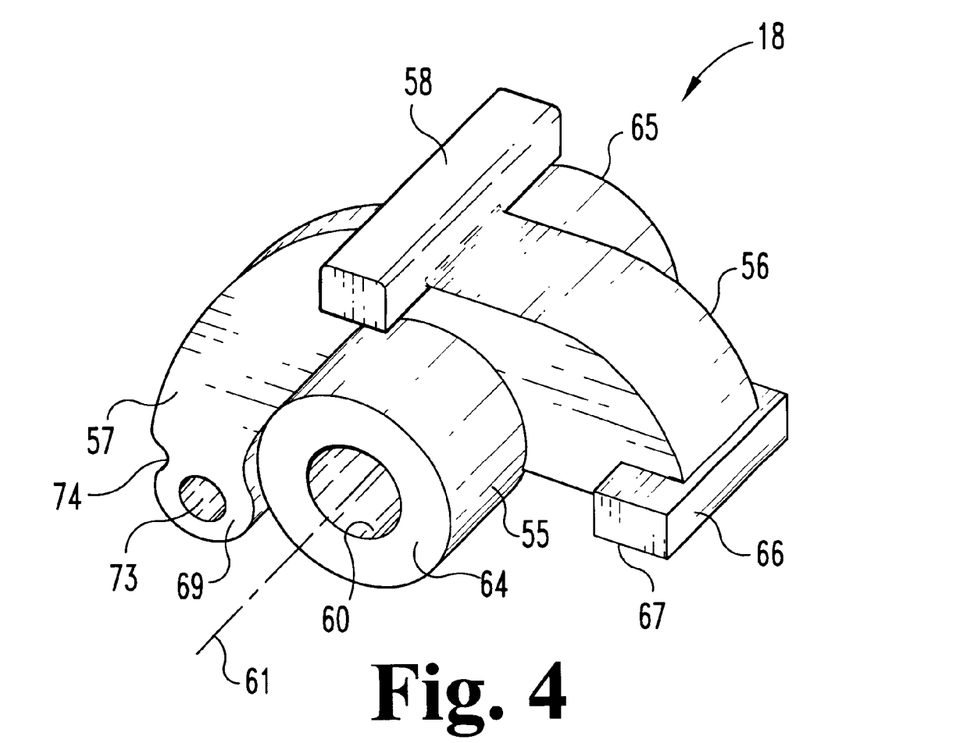
FIG. 4 is a perspective view of central hook actuator 18 of the hold-down device 10 of FIG. 1.

Frame 15 is rigidly connected to the frame longitudinal running frame rails 87 of hoist 11 by appropriate means such as welding, and it is positioned so that when hooks 16 and 17 are actuated, as shown in FIGS. 1 and 4, at least one of hooks 16 and 17 will be properly positioned over the long sill 82 of the corresponding container that has been positioned onto hoist frame 11. Hold-down device 10 may be mounted to the outside or inside of the frame rails 87, as space permits.

Figure 5:
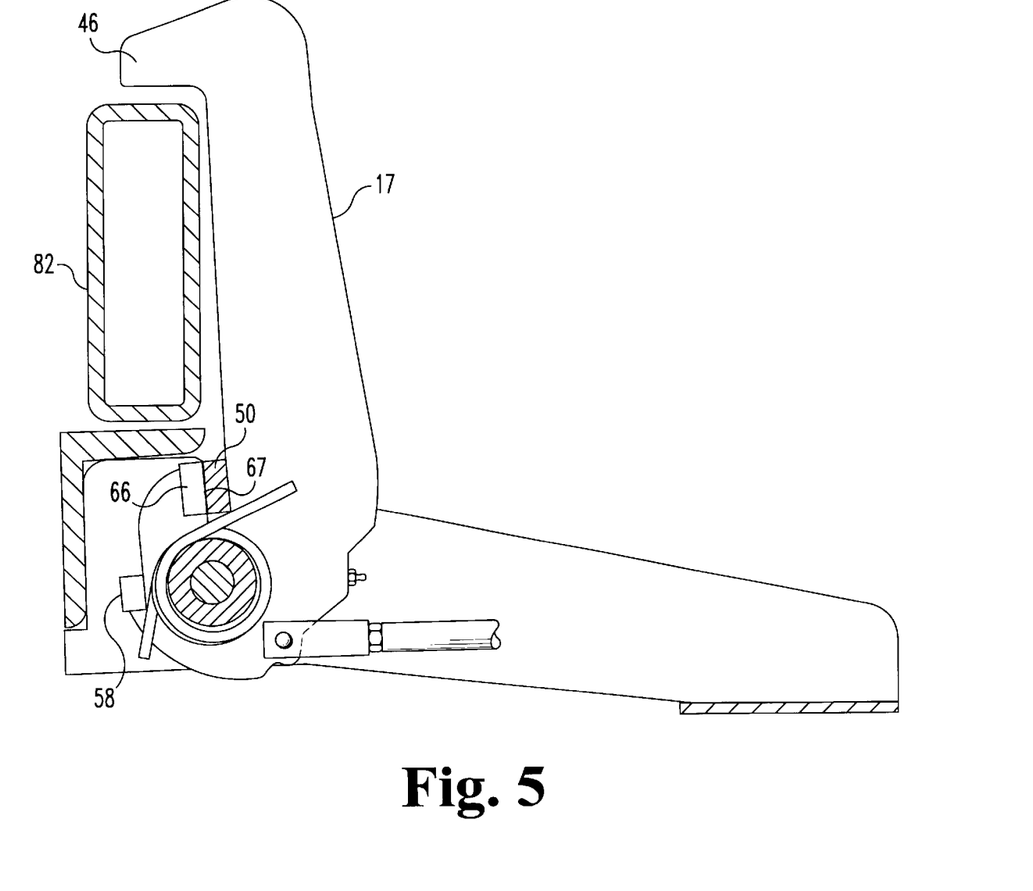
FIG. 5 is a side elevational view of the hold-down device 10 of FIG. 3 and showing hooks 16 and 17 in the activated, locking position.
Figure 6:
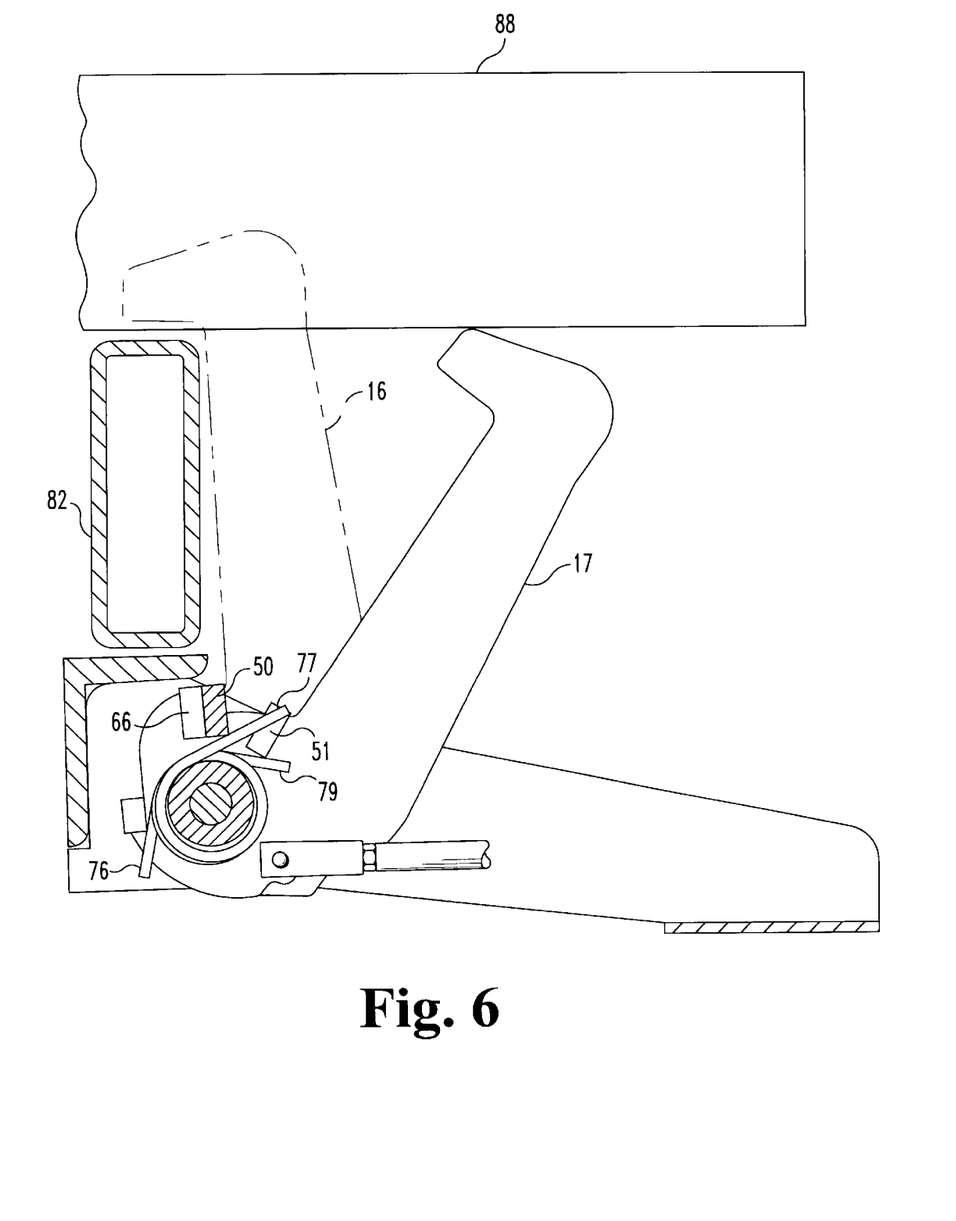
FIG. 6 is a side elevational view of the hold-down device 10 of FIG. 5 and showing hook 17 in the activated, unlocked position.

Hold-down device 10 operates as follows:

With hold-down device 10 in the retracted, unlocked position shown in FIG. 2, air cylinder 23 is activated to retract piston rod 71 which rotates actuator 18 and its spring bar 58 and engagement surface 67 counterclockwise in excess of 90°, approximately to the position shown in FIG. 5. In one embodiment, actuator 18 is configured to rotate through an angle of 99°. Rotation of spring bar 58 further winds terminal arms 76 and 78 of springs 21 and 22 about hub 55. Since bar 66 has also rotated counterclockwise, hooks 16 and 17, under the bias of terminal arms 77 and 79 of springs 21 and 22, also rotate the same approximate 99°, depending on the size, configuration and positioning of the corresponding hoist frame and container. Hooks 16 and 17 are prevented from rotating any further counterclockwise by the abutting engagement of their control arms 50 and 51 against engagement surface 67 of hook bar 66 or by engagement with long sill 82. As shown in FIG. 5, hooks 16 and 17 are both in the activated, locking position, and the hook members 46 are thereby in a hold-down, locking position over the long sill 82 of a container positioned atop hoist frame 11. Containers received onto hoist frames described herein typically include long sills 82 in addition to a plurality of cross sills 88. When the container is received onto the hoist, and hold-down device 10 is activated, a cross sill 88 may impede one of hooks 16 and 17 from fully rotating to the activated, locking position shown in FIG. 5. In this case, as shown in FIGS. 1 and 6, the impeded hook 17, though biased to continue rotating counterclockwise, engages the underside of cross sill 88, and cannot rotate any farther counterclockwise. In a typical container, the cross sills 88 will be between about 12 and 20 inches apart on center and may be up to about 3.5 inches or 3.75 inches wide. In this typical case, the minimum gap between a pair of adjacent cross sills would be a little over about eight inches. The hooks 16 and 17 of device 10 are sized, configured and assembled to be in mutual close proximity. That is, they are relatively close together so that they will not both be impeded by a pair of adjacent cross sills of a typical container. In one embodiment, the total width W of hooks 16 and 17, from outer face 90 to outer face 91, is about seven inches, which would prevent both hooks 16 and 17 from being impeded at the same time by two, adjacent cross sills of a typical container. Likewise, the gap G between hooks 16 and 17 in one embodiment is about four inches, which would prevent both hooks 16 and 17 from being impeded at the same time by a single cross sill 88 in a typical container. The present invention is thus designed to accommodate the vast majority of container configurations. It is recognized, however, that, despite the added cost and weight, a container may be constructed for a special purpose where the cross sills are wider than normal and/or considerably closer together than normal. In such case, the hooks 16 and 17 of device 10 are sized, configured and assembled to be in mutual close proximity relative to the specially sized container so that both hooks cannot be impeded in their rotation to securely hold-down the container. Such mutually close proximity is understood to include values for the width W and gap G that may differ from the foregoing preferred values of seven inches and four inches, respectively, as dictated by the specially sized container. In FIG. 6, since the next, most-adjacent cross sill (not shown) to cross sill 88 is farther from cross sill 88 than the distance between hooks 16 and 17, hook 16 will not be impeded from fully rotating to its activated, locking position. Long sill 82 is thereby successfully engaged by at least one of hooks 16 and 17, and the corresponding container (not shown) is properly locked in the hold-down position.

Figure 7:
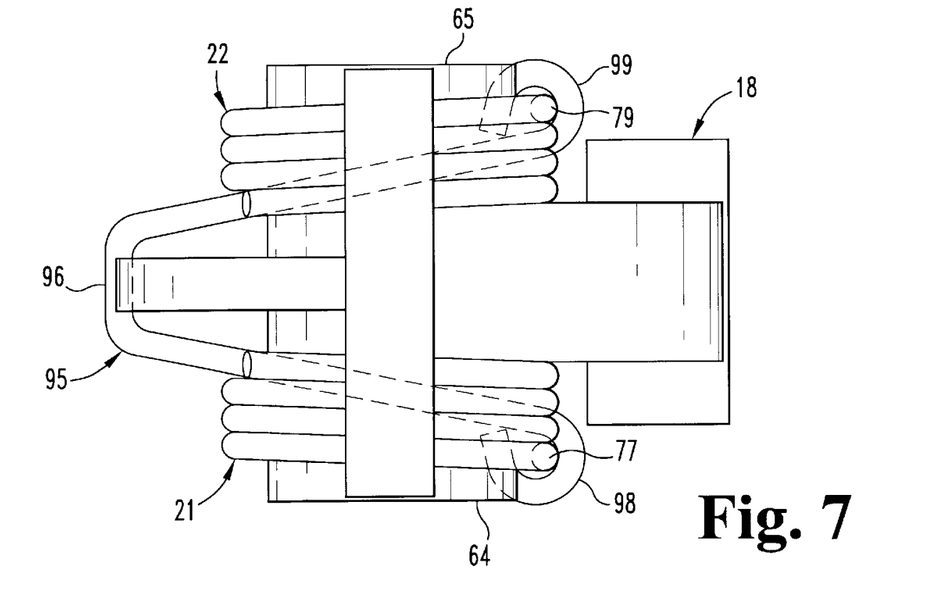
FIG. 7 is a top plan view of central hook actuator 18 and spring loading tool 95 in a spring loading position.
Figure 8:
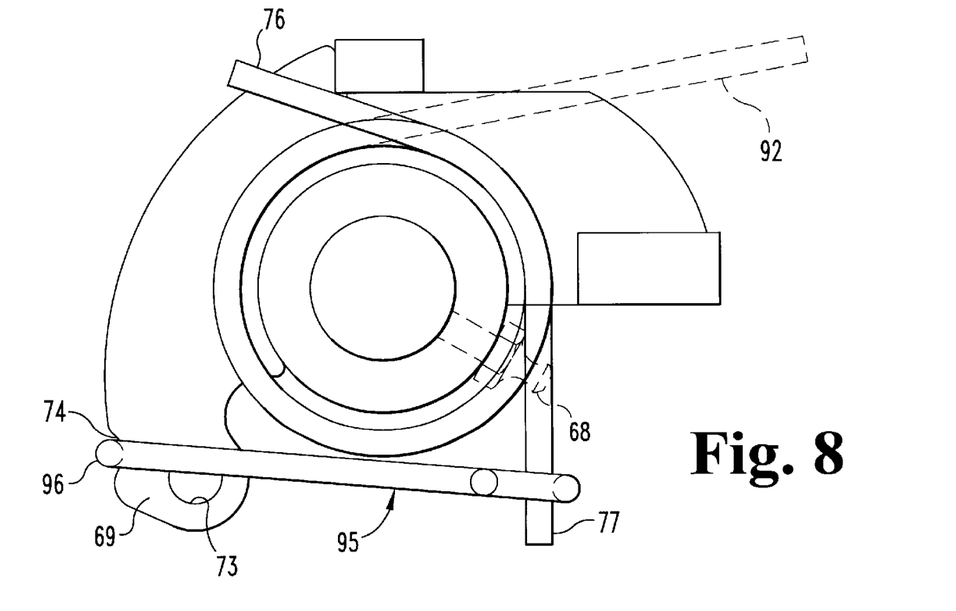
FIG. 8 is a side elevational view of the central hook actuator 18 and spring loading tool 95 of FIG. 7.

Referring to FIGS. 7 and 8 there is shown a spring loading tool 95 to facilitate preloading of springs 21 and 22. Tool 95 comprises a U-shaped piece of wire having a relatively straight, central fin engagement portion 96. The opposing, outboard ends of tool 95 are curved around to form loops 98 and 99 that are sized and shaped to receive the terminal ends 77 and 79 of springs 21 and 22.

In use, springs 21 and 22 are slid onto the opposing ends of hub 55. Actuator 18 is then stabilized such as by clamping it in a vice or similar structure such that the opposing faces 64 and 65 are engaged with the jaws of the vice. Tool 95 is then positioned so that spring terminal ends 77 and 79 (now in the relaxed position shown in dashed lines in FIG. 8 at 92) extend through loops 98 and 99, respectively. Spring ends 77 and 79 may then be manually pulled along with tool 95 to the preloaded condition whereby fin engagement portion 96 is positioned up over outboard end 69 sufficient to allow it to seat within recess 74. Terminal ends 77 and 79 are now held in the preloaded condition, and actuator 18, springs 21 and 22, and the remaining elements may then be assembled as described above. Once actuator 18 and springs 21 and 22 are mounted to frame 15, tool 95 is removed by pulling fin engagement portion 96 down and out of recess 74 whereby terminal ends 77 and 79 rotate up against control arms 50 and 51, respectively, and bias them in the direction of arrow 86.

Components described herein may be manufactured separately or may be integrally formed to accommodate ease of replacement, cost considerations, maintenance concerns and the like. In addition, cylinder 23 is described as an air cylinder, but any other appropriate powering means are also contemplated, such as a hydraulic cylinder or a mechanical device such as a rack and pinion combination.

It is contemplated that actuator 18 may be of different construction or may made to interact differently with the other components of device 10 so long as a powered unit, such as cylinder 23, operates to rotate the hooks 16 and 17 from the activated, locking position to the retracted, unlocked position when desired. For example, and not by limitation, piston rod 71 could be connected with hooks 16 and 17 using a slot and pin arrangement.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A device for securing a container to a hoist, the container having at least one long sill, comprising:
   a frame rigidly connectable to a hoist;
   first and second hooks mounted in mutually close proximity and to said frame to rotate about an axis between a retracted, unlocked position away from the long sill of a container and an activated, locking position disposed at least partially over the long sill;
   biasing means operationally connected with said hooks for urging said hooks toward the activated, locking position; and,
   actuator means for moving said first and second hooks from the activated, locking position to the retracted, unlocked position.

2. The device for securing a container to a hoist of claim 1 wherein said biasing means includes first and second coil springs operationally connected with said first and second hooks, respectively, to urge said hooks toward the activated, locking position.

3. The device for securing a container to a hoist of claim 1 wherein said actuator means includes an actuator mounted to said frame to rotate about said axis between an activating position and a retracting position.

4. The device for securing a container to a hoist of claim 3 wherein said actuator includes a hub and wherein said biasing means includes first and second coil springs that encircle the hub.

5. The device for securing a container to a hoist of claim 4 further including a hook engagement member operationally connected between said hooks and said actuator to limit the rotation of said each of said hooks toward the activated, locking position as a function of the position of said actuator.

6. The device for securing a container to a hoist of claim 5 wherein said hook engagement member includes said actuator having a hook bar sized and configured to engage with and rotate said hooks from the activated, locking position to the retracted, unlocked position when said actuator rotates from the activating position to the retracting position.

7. The device for securing a container to a hoist of claim 6 wherein each of said hooks includes a control arm extending laterally between said hooks to be engageable by the hook bar.

8. The device for securing a container to a hoist of claim 7 wherein each of said coil springs includes a first terminal arm that is operationally connected with one of said hooks to bias said one of said hooks toward the activated, locking position.

9. The device for securing a container to a hoist of claim 8 wherein each of said coil springs includes a second terminal arm that is operationally connected with said actuator to maintain the bias of the spring upon said one of said hooks.

10. The device for securing a container to a hoist of claim 9 wherein said actuator includes a spring bar sized and configured to engage with the second terminal arms.

11. The device for securing a container to a hoist of claim 10 wherein said actuator means includes a pneumatic cylinder mounted to said frame and having a piston rod with an outboard end connected to said actuator to move said actuator between the activating position and the retracting position.

12. The device for securing a container to a hoist of claim 5 wherein said actuator further includes a control fin sized and configured to engage with said hooks, and wherein said springs are disposed on opposite sides of the control fin.

13. The device for securing a container to a hoist of claim 12 wherein the control fin includes a hook bar sized and configured to engage with and rotate said hooks from the activated, locking position to the retracted, unlocked position when said actuator rotates from the activating position to the retracting position.

14. The device for securing a container to a hoist of claim 13 wherein said actuator further includes a spring bar and wherein each of said springs includes first and second terminal arms, the second terminal arms engaged with the spring bar and the first terminal arms engaged with said hooks to urge said hooks toward the activated, locking position.

15. The device for securing a container to a hoist of claim 1 further wherein said frame defines an uppermost surface and wherein the retracted, unlocked position includes the entirety of said hooks being at or below the uppermost surface of said frame.

16. The device for securing a container to a hoist of claim 1 wherein said hooks rotate approximately 99 degrees between the retracted, unlocked position and the activated, locking position.

17. A device for securing a container to a hoist, the container having at least one long sill, comprising:
 a frame rigidly connectable to a hoist;
 first and second hooks mounted to said frame to rotate about an axis between a retracted, unlocked position away from the long sill of a container and an activated, locking position disposed at least partially over the long sill;
 an actuator mounted to said frame to move between an activating position and a retracting position;
 a hook engagement member operationally connected between said hooks and said actuator to limit the rotation of said each of said hooks toward the activated, locking position as a function of the position of said actuator;
 biasing means operationally connected with said hooks for urging said hooks toward the activated, locking position; and,
 power means connected with said actuator to move said actuator between the activating and retracting positions.

18. The device for securing a container to a hoist of claim 17 wherein said hooks are mounted to said frame in mutually close proximity.

19. The device for securing a container to a hoist of claim 17 wherein said biasing means includes at least one coil spring operationally connected with at least one of said first and second hooks to urge said at least one of said first and second hooks toward the activated, locking position.

20. The device for securing a container to a hoist of claim 19 wherein said actuator includes a hub and wherein there are two of said at least one coil springs each mounted on said hub and each operationally connected with one of said hooks to urge said hook toward the activated, locking position.

21. The device for securing a container to a hoist of claim 19 wherein said actuator includes a hub mounted to said frame to rotate about the axis between the activating position and the retracting position and wherein the at least one coil spring encircles the hub.

22. The device for securing a container to a hoist of claim 17 wherein said hook engagement member includes said actuator having a hook bar sized and configured to engage with and rotate said hooks from the activated, locking position to the retracted, unlocked position when said actuator rotates from the activating position to the retracting position.

23. The device for securing a container to a hoist of claim 22 wherein each of said hooks includes a control arm extending laterally between said hooks to be engageable by the hook bar.

24. The device for securing a container to a hoist of claim 23 wherein said biasing means includes at least one coil spring with a first terminal arm that is operationally connected with at least one of said first and second hooks to urge said at least one of said first and second hooks toward the activated, locking position.

25. The device for securing a container to a hoist of claim 24 wherein said at least one coil spring includes a second terminal arm that is operationally connected with said actuator to maintain the bias of said at least one coil spring upon said at least one of said first and second hooks.

26. The device for securing a container to a hoist of claim 25 wherein said actuator includes a spring bar sized and configured to engage with each second terminal arm to maintain the bias of said at least one coil spring.

27. The device for securing a container to a hoist of claim 17 wherein said power means includes a pneumatic cylinder mounted to said frame and having a piston rod with an outboard end connected to said actuator to move said actuator between the activating position and the retracting position.

28. A device for securing a container to a hoist the container having a long sill, comprising:

a frame rigidly connectable to a hoist;

first and second hooks mounted in mutually close proximity and to said frame to rotate about an axis between a retracted, unlocked position away from the long sill of a container and an activated, locking position disposed at least partially over the long sill;

an actuator mounted to said frame to move between an activating position and a retracting position, said actuator engageable with said hooks to rotate said hooks from the activated, locking position to the retracted, unlocked position when said actuator moves from the activating position and the retracting position;

springs operationally connected with said hooks for urging said hooks toward the activated, locking position; and,     power means connected with said actuator to move said actuator between the activating and retracting positions.

* * * * *